United States Patent
Friedmann

(10) Patent No.: US 9,322,441 B2
(45) Date of Patent: *Apr. 26, 2016

(54) CLAMPING ELEMENT FREEWHEEL

(75) Inventor: Oswald Friedmann, Lichtenau (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 722 days.

This patent is subject to a terminal disclaimer.

(21) Appl. No.: 13/068,415

(22) Filed: May 10, 2011

(65) Prior Publication Data

US 2011/0278124 A1 Nov. 17, 2011

(30) Foreign Application Priority Data

Nov. 10, 2008 (DE) .......................... 10 2008 056 635
Sep. 24, 2009 (WO) ................ PCT/DE2009/001340

(51) Int. Cl.
*F16D 41/07* (2006.01)
*F16H 29/04* (2006.01)

(52) U.S. Cl.
CPC .............. *F16D 41/073* (2013.01); *F16H 29/04* (2013.01)

(58) Field of Classification Search
CPC ........ F16H 29/04; F16D 41/07; F16D 41/073
USPC .................................. 74/117; 192/41 A, 45.1
See application file for complete search history.

(56) References Cited

U.S. PATENT DOCUMENTS

| 3,320,007 | A | * | 5/1967 | Tennies et al. ................ 384/132 |
| 3,443,672 | A | * | 5/1969 | Giese .......................... 192/45.1 |
| 3,702,649 | A | * | 11/1972 | Giese ........................... 192/41 A |
| 3,729,076 | A | | 4/1973 | de Lavalette |
| 3,844,391 | A | * | 10/1974 | Hallerberg .................. 192/41 A |
| 4,112,778 | A | * | 9/1978 | Korosue .......................... 74/117 |
| 4,114,739 | A | * | 9/1978 | Colonna et al. ............. 192/41 A |
| 4,546,864 | A | | 10/1985 | Hagen et al. |
| 8,376,107 | B2 | * | 2/2013 | Man ............................. 192/45.1 |

(Continued)

FOREIGN PATENT DOCUMENTS

CN 2874123 Y 2/2007
DE 32 29 685 C1 11/1983

(Continued)

OTHER PUBLICATIONS

P.E. Erickson, et al., Minimizing Stress Concentrations Around Circular Holes in Uniaxially Loaded Plates, Experimental Mechanics, vol. 18, Issue 3, pp. 97-100, Mar. 1978.

(Continued)

*Primary Examiner* — Robert Hodge
*Assistant Examiner* — Terry Chau
(74) *Attorney, Agent, or Firm* — Alfred J. Mangels

(57) ABSTRACT

A clamping element freewheel including an inner ring and an outer ring that can be rotated relative to the inner ring in at least one rotational direction. A cage for clamping elements is between the inner ring and the outer ring, with a plurality of clamping elements. The clamping elements are pivotable between a clamping position, in which they prevent relative rotation between the inner and outer rings, and a release position, in which they enable relative rotation between the inner and outer rings. A clamping element preload is provided to preload the clamping element radially inwardly and in the clamping position direction. The clamping element preloading is provided by springs that are configured separately for each clamping element.

17 Claims, 6 Drawing Sheets

(56) References Cited

U.S. PATENT DOCUMENTS

| | | |
|---|---|---|
| 2001/0019003 A1 | 9/2001 | Jackwerth et al. |
| 2007/0074945 A1 | 4/2007 | Ponson et al. |
| 2007/0175722 A1 | 8/2007 | Straub |

FOREIGN PATENT DOCUMENTS

| | | |
|---|---|---|
| DE | 100 09 450 A1 | 9/2001 |
| DE | 10 2006 004 491 A1 | 8/2007 |
| EP | 1 650 071 A2 | 4/2006 |
| FR | 2093188 | 1/1972 |
| FR | 2 858 376 A1 | 2/2005 |

OTHER PUBLICATIONS

Jain, N.K., The Reduction of Stress Concentration in a Uni-Axially Loaded Infinite Width Rectangular Isotropic/Orthotropic Plate with Central Circular Hole by Coaxial Auxiliary Holes, IIUM Engineering Journal, vol. 12, No. 6, pp. 141-150, 2011.

Shubhrata Nagpal, et al., Mitigation Curves for Determination of Relief Holes to Mitigate Stress Concentration Factor in Thin Plates Loaded Axially for Different Discontinuties, International Journal of Engineering and Innovative Technology, vol. 2., Issue 3, pp. 1-7, Sep. 2012.

\* cited by examiner

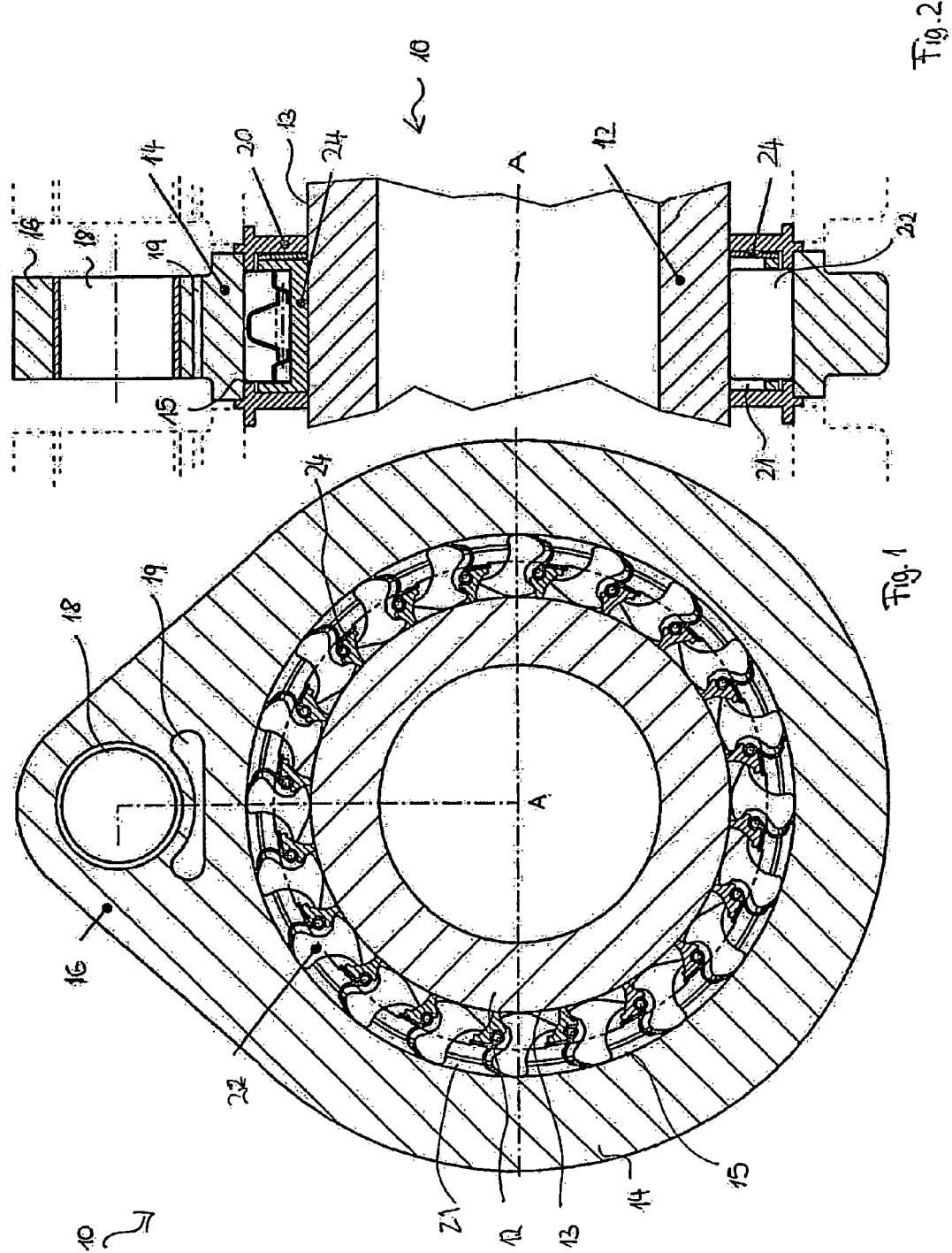

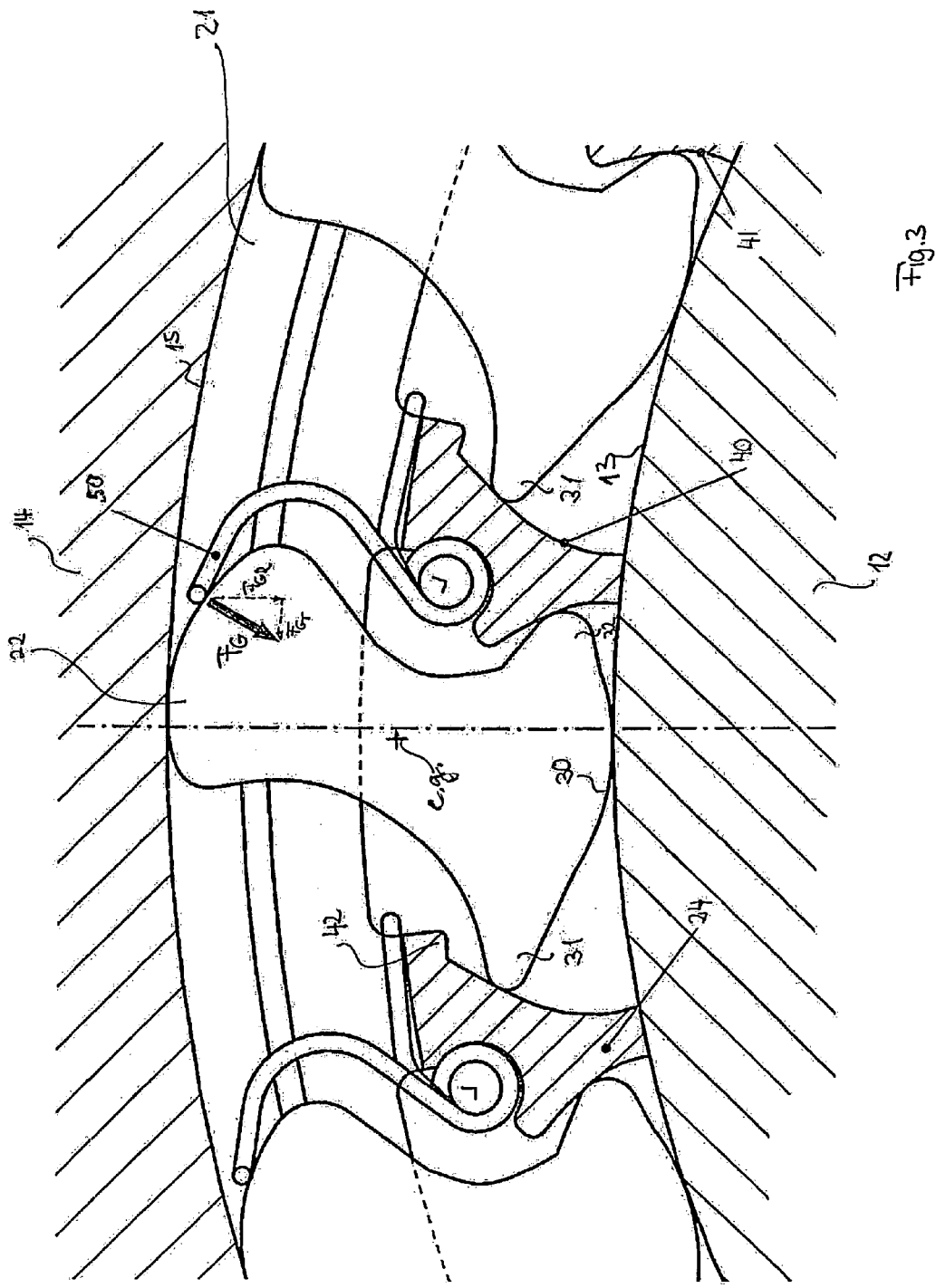

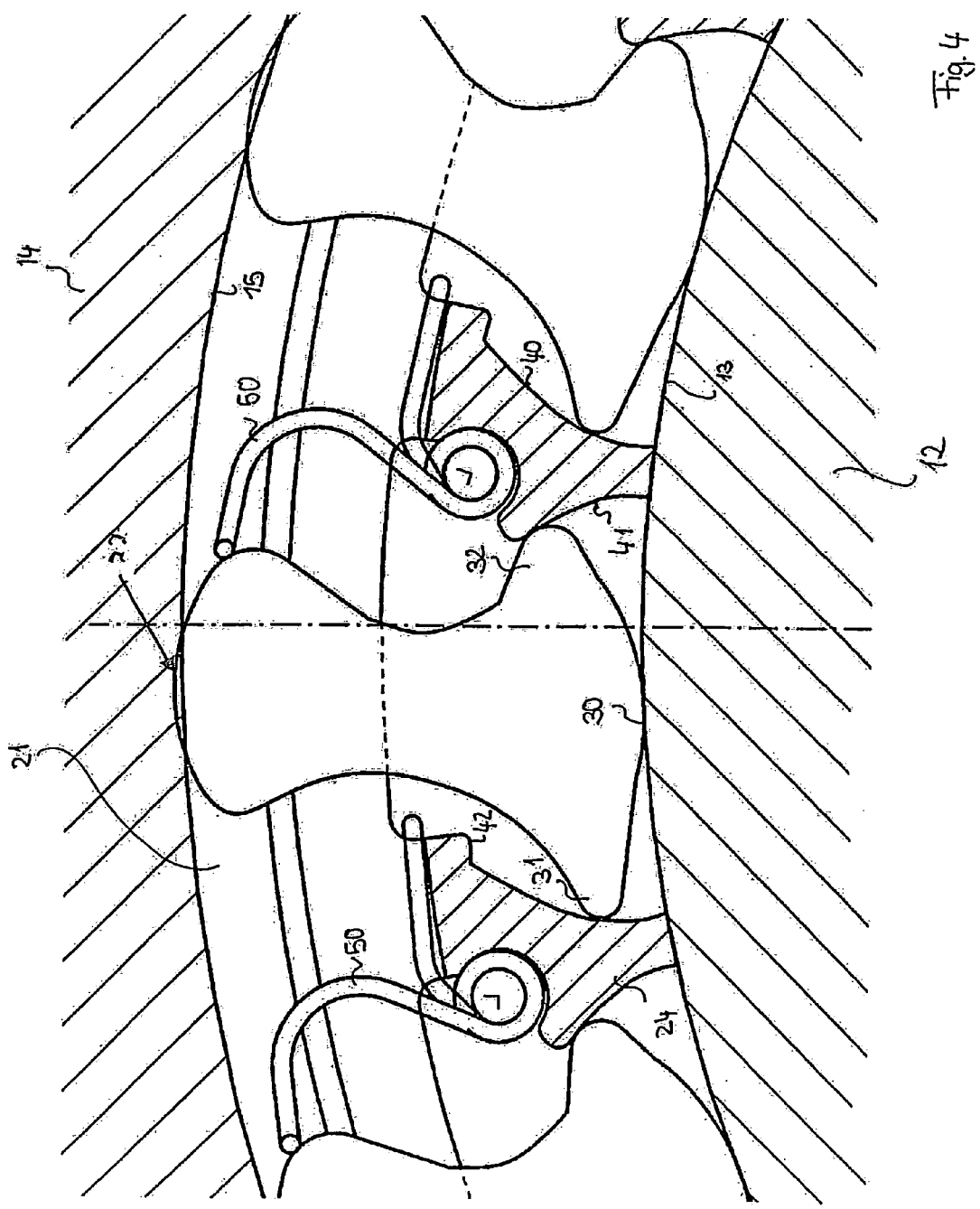

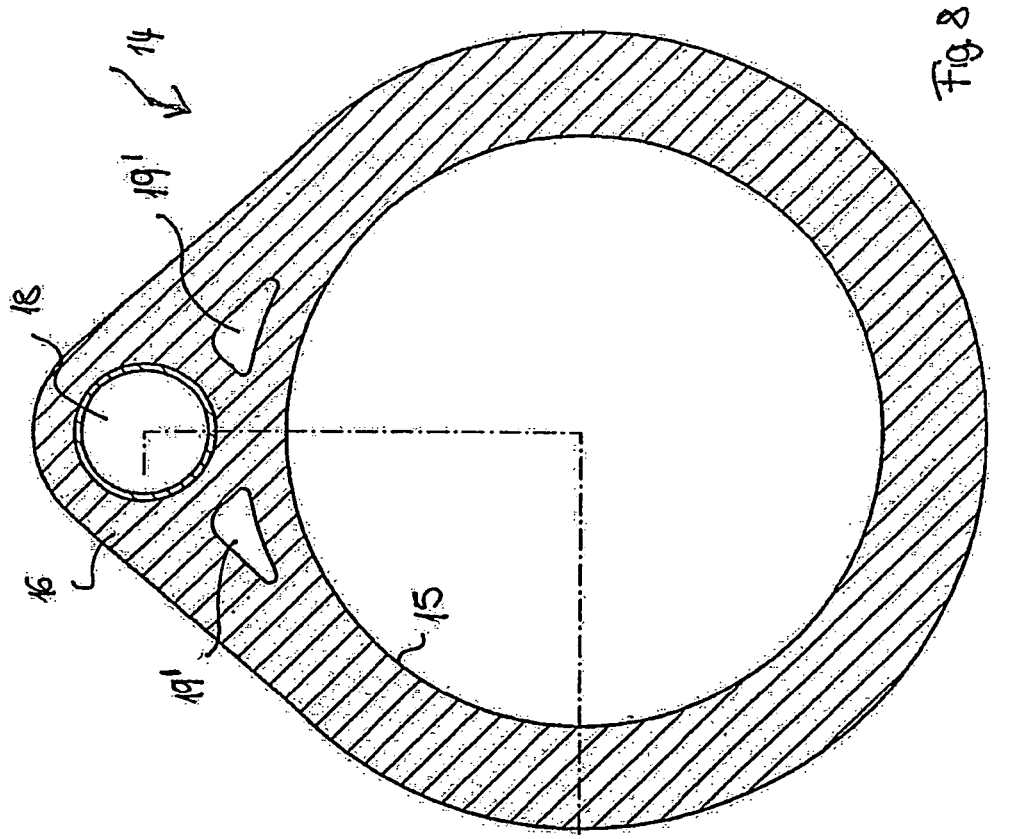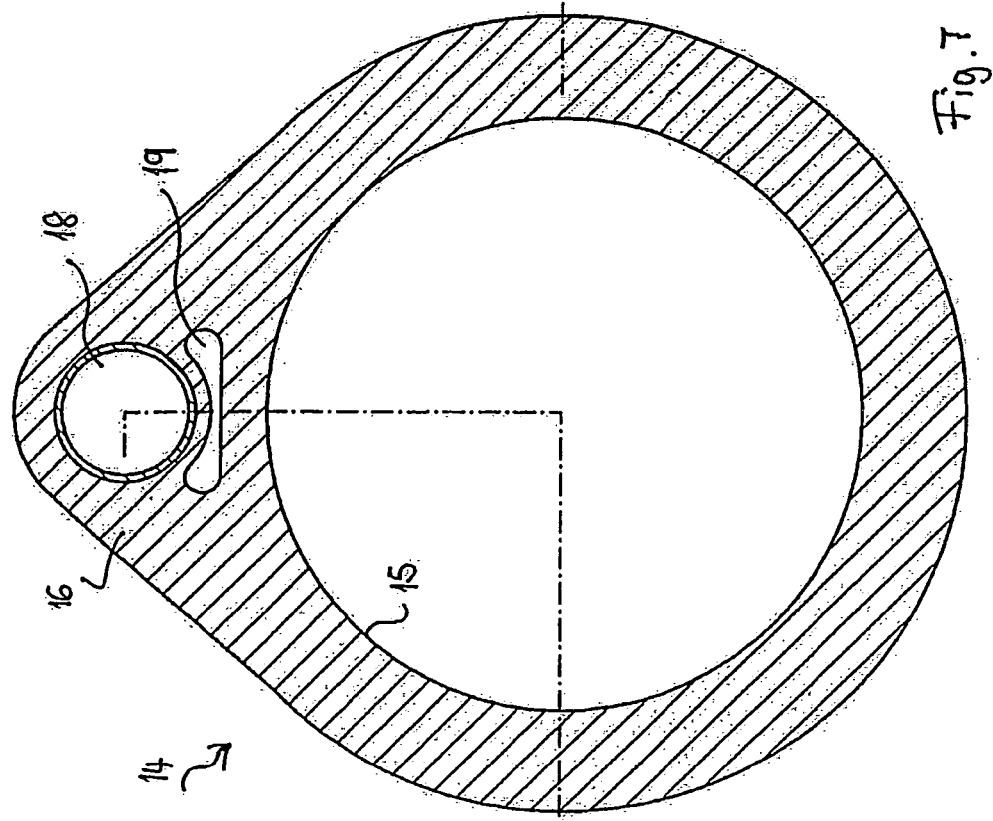

CLAMPING ELEMENT FREEWHEEL

BACKGROUND OF THE INVENTION

1. Field of the Invention

The present invention relates to a clamping element freewheel, in particular a damped clamping element freewheel with a cage, wherein the freewheel is useable, e.g., on an output side of a crank continuously variable transmission. The invention also relates to a crank continuously variable transmission (CVT) with a freewheel of this type.

2. Description of the Related Art

A crank CVT is known, e.g., from EP 1 650 071 A2. An input shaft that is drivable by an engine, and which forms an input shaft for a transmission, is provided with an adjustable eccentric drive arrangement with eccentric components. The drive arrangement is connected to a driven shaft through a rod shaped connection elements, wherein the driven shaft forms an output shaft for the transmission. The driven shaft is driven to rotate by transferring the stroke of the connection elements through freewheel devices to the driven shaft, and thus the output side of the transmission. The freewheel devices are provided between the rod shaped connection elements and the driven shaft.

In that crank CVT, the driving crankshaft and the output shaft, or the driven shaft, are aligned parallel to one another and rotatably supported in a transmission housing. When torque is introduced by an internal combustion engine into the crankshaft, the torque is transmitted through the crank CVT to the output shaft. Depending on the position of the eccentric components with respect to the rotation axis of the drive shaft, the eccentricity of the eccentric components, and thus their rotation axis relative to the drive shaft, is changed, which facilitates adjusting the stroke transferred from the connecting rod shaped connecting element to the drive shaft, and thus the transmission ratio of the transmission. At the output shaft the torque can be captured, e.g., for driving wheels of a vehicle. Typically, plural eccentric units are arranged in the crank CVT in the axial direction of the crankshaft behind one another, at which respective connecting rod shaped connection elements are attached, and which are connected with a respective number of freewheel units on the output side of the transmission, wherein the freewheel units on the output shaft are also arranged behind one another in the axial direction.

Two basic types of freewheels are known, namely shiftable freewheels that selectively block a relative rotation of an outer ring and an inner ring in one of the two directions of relative rotation as a function of a shifting position, and freewheels that have a fixed and not variable blocking device, in which they prevent a relative rotation between an outer ring and an inner ring, while a relative rotation of the outer ring and the inner ring is facilitated in another direction of relative rotation. In shiftable freewheels, e.g., in order to implement a reverse gear no additional transmission and no separate engine has to be provided since shifting the freewheels facilitates changing the rotation direction of the output shaft relative to the rotation direction of the input shaft of the transmission. For non-shiftable freewheels, either a separate motor, e.g., an electric motor, is provided, or another transmission is coupled subsequent to the output shaft of the transmission, e.g., a planetary transmission that is part of the load transfer path in the transmission when required, namely when a reverse driving function is to be provided and which is otherwise decoupled.

Shiftable freewheels are typically configured as roller freewheels in which rollers roll off between an inner ring and an outer ring, and are pressed through suitable spring loading into a clamping gap in one or another relative direction of rotation. Thus, at least one of the inner ring or the outer ring has a profile so that the clamping gap is generated.

As an alternative to the rolling element freewheels, clamping element freewheels are known that are more compact and lighter than rolling element freewheels. In the clamping element freewheels the clamping elements are profiled, e.g., so that they block the relative rotation of the inner ring or outer ring in one position, wherein the inner ring and the outer ring can have circular cross sections and block the relative rotation in another position.

In freewheels, the position of the clamping or rolling elements in which the clamping or rolling elements block the inner ring and the outer ring relative to one another is designated as the clamping or blocking position, in which the rolling or clamping elements are disposed in a clamping gap formed between the inner ring and the outer ring. The position in which they facilitate a rotation of the inner ring and the outer ring relative to one another is designated as the freewheeling position. This language is used in the instant description also for clamping element freewheels, in which the blocking or release is a function of a currently effective diameter of the clamping elements and not of a position of the clamping elements along the circumferential direction.

Thus, it is an object of the present invention to provide a clamping element freewheel, in particular for a crank CVT, which has a robust configuration and operates reliably.

SUMMARY OF THE INVENTION

It is an object of the invention to provide a freewheel with clamping elements that are configured through their profile in a cross section perpendicular to the axial direction of the freewheel, so that they can assume a clamping position or a freewheeling position depending on their pivot position through rolling on the inner ring. The particular clamping elements are retained and supported in a cage that is provided between the inner ring and the outer ring, and a clamping element spring loading is provided at the cage separately for each clamping element. The pivot position thus defines an effective diameter of the clamping elements, which changes as a function of the tilt position. The separate clamping element spring loading facilitates selecting a direction and size of the force by a suitable selection of a spring constant and an effective direction of the force, so that geometrical tolerances hardly affect the size of the effective force. In addition to a basic contact pressure for each clamping element, which facilitates a quick reset for the movement into the clamping gap, a portion of the energy resulting from the movement out of the clamping gap can be dissipated through friction, or it can be stored in the spring preloadings for the clamping elements in order to provide a quick back rotation of the clamping elements at the end of the damping process, that means back into the clamping gap. Thus, reliable operations for the freewheel can be provided through the particular clamping element spring preloadings for each clamping element. Furthermore, a contact of the clamping element at the inner ring can be provided in any operating condition by an effective direction of the force, which has a radially inward component through the particular spring preloadings of the clamping elements.

According to a preferred embodiment, the inner ring and the outer ring are respectively circular in a sectional view perpendicular to the axial direction of the freewheel. Thus, producing the inner ring and the outer ring is simple. That is facilitated by using clamping elements with a profile in a sectional view perpendicular to the axial direction, wherein the profile of the clamping elements is configured so that they facilitate a relative rotation of the inner ring and the outer ring in a pivoted position of the clamping element. That means there is a clearance between the clamping element and, e.g., the outer ring when the clamping element contacts the inner ring. In other pivot positions, the rotation of the inner ring and the outer ring relative to one another is blocked, which is the case when a clamping element is simultaneously clamped at the inner ring and the outer ring.

Preferably, the cage is rotatable on the inner ring. Additionally preferably, a cage spring loading is provided which preloads the cage against the inner ring and/or a component permanently connected with the inner ring. That means that friction energy is generated during a rotation of the cage relative to the inner ring, so that the movement of the clamping element out of the clamping gap and the movement of the cage relative to the inner ring are dampened and the energy is dissipated.

Thus, for example, the outer ring can also be supported on the inner ring by a straight bearing or a roller bearing, and the straight bearing or roller bearing can be fixed to the inner ring, preferably pressed on. The cage spring loading can then preload the cage in the axial direction against one of the bearing rings of the straight bearing or roller bearing.

According to a preferred embodiment, the cage spring preloading is formed by a disc spring, which provides a simple configuration.

Preferably, the springs for the clamping element spring preloading are supported at the cage, which in turn provides advantages during assembly since the cage with the clamping element preloading springs can be configured as a unit in advance, and can then be mounted with inner rings and outer rings and the clamping elements.

The springs for the clamping element spring preloading are configured as arm—or leaf springs, preferably with a relatively small spring constant. That facilitates on the one hand adjusting the direction of the contact pressure of the springs or the effective direction of the springs, and on the other hand dimensional tolerances hardly affect the amount of force actually imparted upon the clamping elements due to the small spring constant.

The clamping element spring preloading force is preferably selected so that the radial component of the clamping element spring preloading force, that means the component of the force that is effective in a radial direction of the freewheel, is greater than a maximum centrifugal force of the respective clamping element. Thus, the clamping element can be reliably pressed against the inner ring in any operating condition, so that lifting the clamping element from the inner ring is reliably prevented in any operating condition.

Preferably, the center of gravity of the particular clamping elements is arranged in the radial direction radially outside a support portion for the clamping elements, wherein the support portion is provided at the cage. Thus, the pivoting or rolling movement of the clamping elements can be reliably and simply performed, and is hardly influenced by support portions at the cage.

According to a preferred embodiment the cage is configured so that a stop is provided for each clamping element at the cage. The stop can interact with a portion of the clamping element that is configured accordingly, so that a movement path of the clamping element is limited for its movement out of the clamping position into the freewheeling position, which prevents the clamping elements from moving out of the cage or too far away from the clamping gap. That helps to prevent a failure of the freewheel and provides a reliable and quick shift between a clamping position and a freewheel position.

Preferably, the clamping elements are supported in the cage with such clearance, and are shaped with respect to the inner ring, so that the clamping elements can roll on the inner ring without the inner ring moving or the clamping element having to slide on the inner ring or cage. Thus, the contours of the cage and the sliding element are preferably matched, so that the contour of the cage includes a shape in the support portion, wherein the shape corresponds to the roll curve of the profile. That means the shape is identical to the roll curve, but moved in parallel by a particular small clearance. Thus, the clamping element always has the same small clearance relative to the cage. That provides that no excessive energy is dissipated in the freewheel which creates friction and thus heat, which may have to be removed.

According to a preferred embodiment, the outer ring of the freewheel is configured with a connecting rod eye for connection with a connecting rod shaped connection element of a crank—CVT. The rod shaped connection element establishes a connection to the drive side of the transmission.

According to a preferred embodiment, one or plural stress reduction pass-through openings, or load relief pass-through openings, are provided adjacent to the connecting rod eye. That helps to prevent a fracture or tearing of the outer ring in the portion of the connecting rod eye, since load relief openings of that type significantly reduce the stresses in the portion of the connecting rod eye.

BRIEF DESCRIPTION OF THE DRAWINGS

The invention is subsequently described with reference to the accompanying drawing figures, wherein:

FIG. 1 illustrates a cross-sectional view of a freewheel according to an embodiment of the invention in a direction perpendicular to the axial direction of the freewheel;

FIG. 2 illustrates a cross-sectional view in an axial direction through the freewheel according to FIG. 1;

FIG. 3 illustrates a detail of the freewheel according to FIG. 1, wherein the freewheel is not loaded;

FIG. 4 illustrates a view according to FIG. 3, wherein the freewheel, however, is loaded;

FIG. 7 illustrates a first embodiment of the outer ring; and

FIG. 8 illustrates a second embodiment of the outer ring.

DESCRIPTION OF THE PREFERRED EMBODIMENTS

Figure 5:
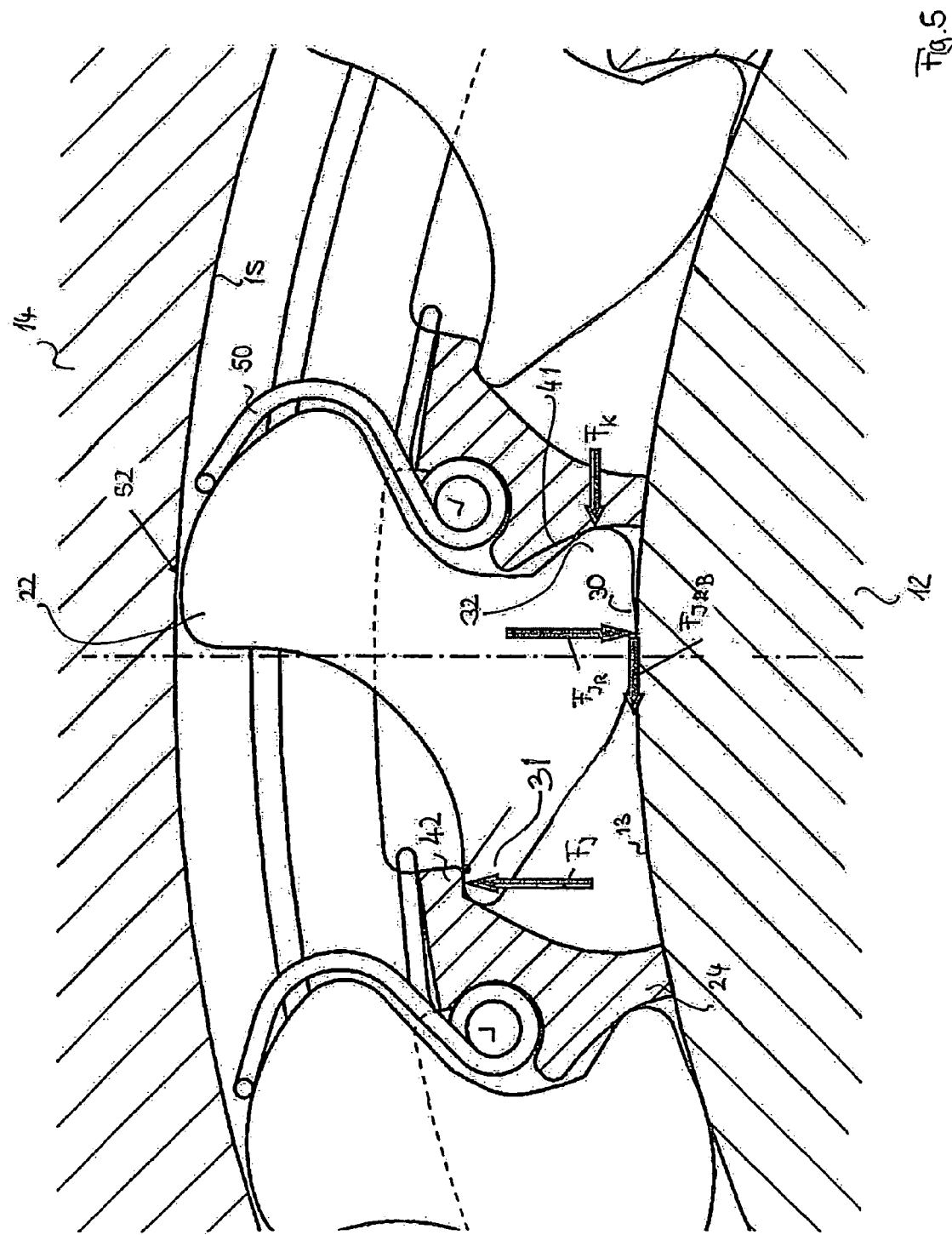
FIG. 5 illustrates a view according to FIGS. 3 and 4 describing the damping process.

FIG. 1 illustrates a clamping element freewheel 10 according to an embodiment of the invention in a cross-sectional view in a direction perpendicular to the axial direction, and FIG. 2 illustrates a cross-sectional view in the axial direction. Details of the views according to FIGS. 1 and 2 are illustrated in FIGS. 3 through 5 or 6.

The damped clamping element freewheel 10 includes an inner ring 12 and an outer ring 14 having a common axis of rotation A, and which are concentric relative to one another. The inner ring 12 has a circular outer surface 13 in the cross-sectional view illustrated in FIG. 1. The outer ring 14 has a circular inner surface 15 in the cross-sectional view illustrated in FIG. 1.

The inner ring 12 can be, e.g., identical to the output shaft of a crank CVT, or it can be non-rotatably connected with the output shaft, e.g., through a transmission, as required. The outer ring 14 is provided as a circular ring with a bulge 16 in a radially outward direction, wherein a connecting rod eye 18 is integrated in the portion of the bulge 16. A connection to the input side of the crank CVT can be provided through the connecting rod eye 18, e.g., through connecting rod shaped connection elements (not shown), so that the stroke generated by the eccentric units at the connecting rod shaped connection elements is transferred to the outer ring 14 and causes a rotation of the outer ring 14.

FIG. 1 furthermore illustrates a stress reduction pass-through opening 19 at the portion of the connecting rod eye 18, that means adjacent thereto. The stress reduction pass-through opening 19 in the embodiment illustrated in FIG. 1 is configured essentially as an elongated opening extending in the tangential direction relative to the rod eye 18 or the inner surface 15 of the outer ring 14. The side of the opening oriented toward the connecting rod eye 18 follows the shape of the connecting rod eye, so that the tension reduction pass-through opening 19 is tapered in a center portion, when viewed in the tangential direction relative to the edge portions.

FIG. 7 illustrates the outer ring 14 of FIGS. 1 and 2 in detail. FIG. 8 illustrates an alternative embodiment of the outer ring 14, in particular of the stress reduction pass-through openings 19', wherein two separate stress reduction pass-through openings 19' are provided in the portion adjacent to the bulge 16 of the outer ring 14. The stress reduction pass-through openings 19 or 19' unload the bulge 16 so that stresses are reduced in that portion. Thus, the stress reduction openings are preferably configured overall as pass-through openings, or stress relief openings, wherein however blind bores are also feasible in principle.

Figure 6:
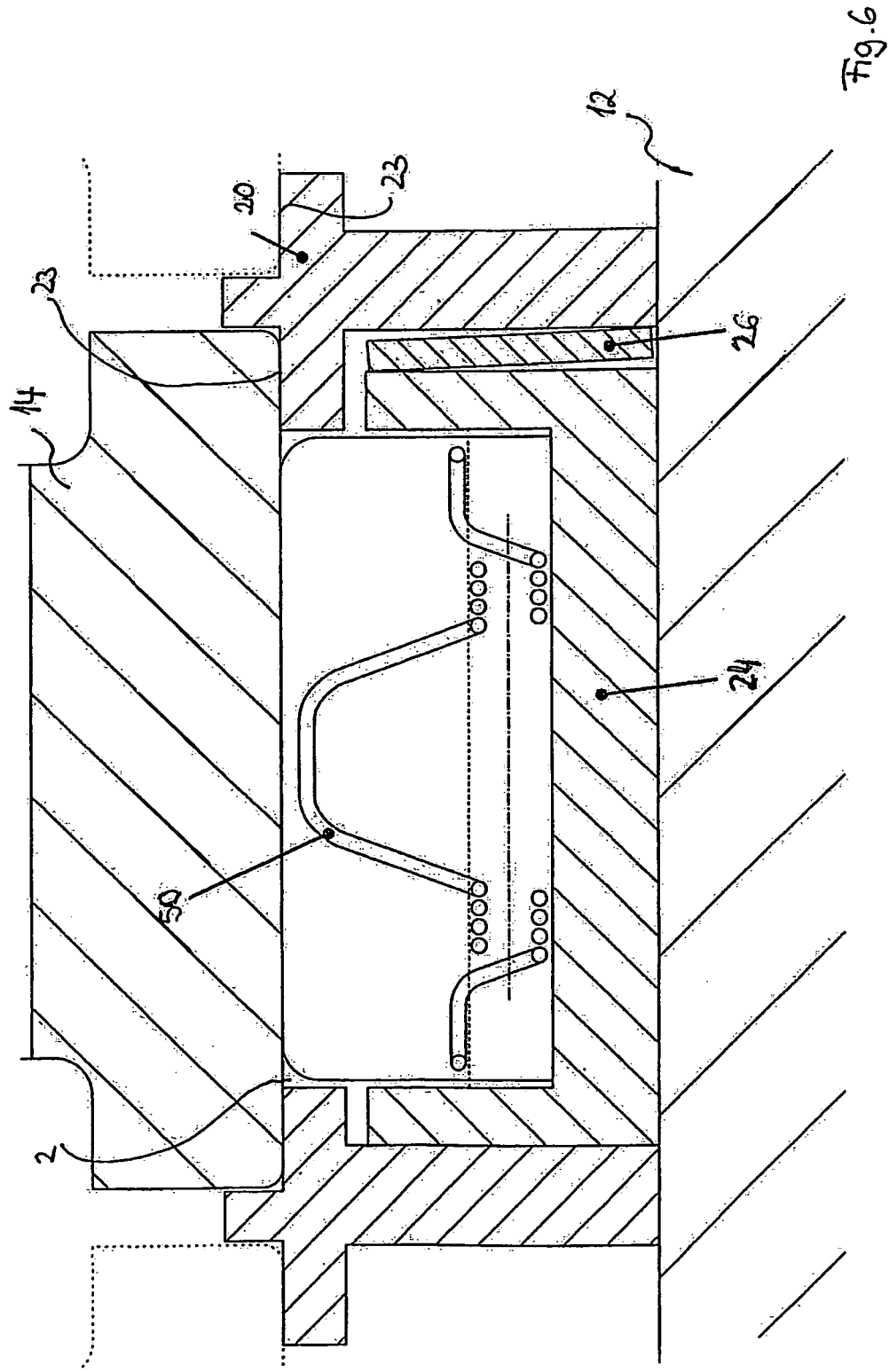
FIG. 6 illustrates an enlargement of the view according to FIG. 2.

As apparent best from FIGS. 2 and 6, the outer ring 14 is supported on the inner ring 12 through a straight bearing 20. The straight bearing 20 is pressed onto the inner ring 12 or the output shaft. Thus, the outer ring 14 is rotatably supported relative to the inner ring 12. Thus, an annular gap 21 is formed between the inner surface 15 of the outer ring and the outer surface 13 of the inner ring 12. Clamping elements 22 are inserted into the annular gap 21, wherein the clamping elements are supported through a cage 24. The cage 24 is also rotatably supported on the inner ring and can be in contact therewith. Furthermore, cage 24 is axially preloaded through a disc spring 26, as evident from FIG. 6. Thus, the disc spring 26 forms a cage spring preloading. Thus, the cage 24 is pressed against the left bearing ring of the straight bearing 20 through the disc spring 26. Since the bearing rings of the straight bearing 20 are fixed so that they cannot rotate relative to the inner ring 12, friction is generated when the cage 24 is rotated relative to the inner ring 12, or relative to the straight bearing 20, so that friction energy is dissipated when the cage 24 is rotated.

As can be derived from FIG. 6, a bearing ring of the straight bearing 20 can be respectively used together at axially adjacent ends of outer ring 14 when the support surface of the straight bearing 20 towards the outer ring 14 is formed. Thus, two support surfaces 23 are formed on a bearing ring of the straight bearing 20, as is apparent in FIG. 6, respectively for one of two adjacent outer rings.

Subsequently, the cage 24 and the spring preloading for the clamping elements 22 are described in detail, wherein reference is made in particular to FIGS. 3 through 5.

The clamping elements 22 respectively include a roll surface 30 through which they can roll on the inner ring 12 without sliding thereon. By rolling on the inner ring 12, in particular on an outer circumferential surface 13 of the inner ring 12, the roll surface 30 facilitates a movement of the clamping elements between the non-loaded position of the freewheel 10 illustrated in FIG. 3 and the loaded position of the freewheel 10 illustrated in FIG. 4.

Thus, the cage 24 is provided with support surfaces 40 and 41, which are formed so that a uniform clearance is always provided between the contour surface of the clamping elements 22 and the support surfaces 40 and 41 of the cage 24 when the clamping elements 22 move between the non-loaded position and the loaded position of the freewheel, so that the cage 24 is not moved or influenced. That means that the support surfaces 40, 41 substantially correspond to the rolling contour of the lug-shaped clamping element portions 31, 32 but are moved parallel thereto, so that the same clearance between the cage 24 and the clamping element 22 is always provided. In the non-loaded position of the freewheel illustrated in FIG. 3, in which the clamping elements 22 are pivoted to the right (clockwise) with reference to a tangent at the inner ring 12 at the contact point of the clamping elements 22, the clamping elements 22 are provided with a clearance relative to the inner surface 15 of the outer ring 14.

The cage 24 furthermore includes a stop 42, configured as a stop lug for each clamping element, wherein the lug shaped portion 31 of the clamping element 22 can contact the stop lug when the clamping element 22 moves from the loaded position into a release position and can thus limit the movement of the clamping element 22, which means to limit excessive pivoting of clamping element 22.

The cage 24 respectively includes particular arm springs 50 for a clamping element spring preloading for each clamping element 22. The arm springs 50 impart a basic contact force $F_G$ upon the clamping element 22, wherein the basic contact force is oriented in the radially inward direction, and in a direction toward the clamping position (to the left in FIG. 3). Thus, the basic contact force $F_G$ acts at an inclined angle in a direction toward the gap 21 and in the radially inward direction. The tangential component $F_{GT}$ of the basic contact force $F_G$ is selected so that it provides the basic spring loading toward the clamping position or clamping gap. That means a sufficient basic spring loading is provided for the clamping element 22 in a direction toward the clamping gap. The radial component $F_{GR}$ of the basic contact force $F_G$ is preferably selected so that it is greater than the maximum operational centrifugal force acting upon the clamping element 22, and thus it prevents a lift-off of the clamping element 22 from the inner ring 12. The arm spring 50 preferably has a relatively small spring constant, so that dimensional tolerances, e.g., when installing the arm springs 50 at the cage 24 or the clamping elements 22, hardly influence the basic contact force $F_G$.

In the clamping position illustrated in FIG. 4, which is schematically illustrated by an overlap of the outer ring 14 and the clamping element 22, the clamping element 22 is pivoted to the left, counterclockwise relative to the position illustrated in FIG. 3, and thus clamps the inner ring 12 and the outer ring 14 relative to one another. Thus, the inner and the outer ring 12 or 14 can only be rotated together in a counter-clockwise direction of rotation in FIG. 4.

When the freewheel is rotated at high speed, clamping element 22 rotates out of the clamping gap, as illustrated in FIG. 5, and pivots in the clockwise direction, so that the arm spring 50 flexes under load and an air gap 52 is created between the inner surface 15 of the outer ring 14 and the clamping element 22. Thus, the arm spring 50 absorbs a small portion of the energy which is created when the clamping element 22 rotates out of the clamping gap. The stored energy in the arm spring 50 is used at the end of the damping process for turning the clamping element 22 back in a counterclockwise direction toward the clamping gap, and thus into the position illustrated in FIG. 3.

When moving out of the clamping position into the freewheeling position the clamping element 22 furthermore rolls on the outer surface 13 of the inner ring 12 with its rolling surface 30 until the lug-shaped portion 31 of the clamping element 22 comes in contact with the stop 42 at the cage 24. That generates an impulse force $F_J$ upon the cage, which can lead to a movement of the cage 24 relative to the inner ring 12 or the straight bearing 20 connected with the inner ring 12. Such cage movement is dampened by the friction between the straight bearing 20 and the cage 24 by dissipating energy through friction. The reactive force $F_{JR}$ generated at the clamping element 22 generates a braking force $F_{JRB}$ in the form of a friction force, and thus also dissipates energy from the system. Thus, the movement of the clamping element 22 out of the clamping gap is limited by contact at the stop 42 of the cage 24, and respective vibrations are dampened by the friction forces so that clamping element 22 can return quickly and reliably into the start position illustrated in FIG. 3, and can be brought from there into the clamping position in a reliable manner. The movement of the cage 24 furthermore also generates a friction force $F_K$ between the other lug-shaped clamping element portion 32 of the clamping element 22 and the respective support surface 41 at the cage, wherein the friction force dampens the oscillating movement of the clamping element 22.

What is claimed is:

1. A clamping element freewheel comprising:
an inner ring having an axis of rotation;
an outer ring coaxial with and rotatable relative to the inner ring in a first direction of rotation, and an annular gap between an outer cylindrical surface of the inner ring and an inner cylindrical surface of the outer ring;
a cage positioned between the outer cylindrical surface of the inner ring and the inner cylindrical surface of the outer ring for receiving and supporting in circumferentially spaced relationship a plurality of circumferentially distributed clamping elements that are carried between the inner ring and the outer ring and are in contact with the outer cylindrical surface of the inner ring, wherein the cage is in contact with the outer cylindrical surface of the inner ring and is rotatable on the outer cylindrical surface of the inner ring and includes a plurality of circumferentially spaced openings for receiving respective circumferentially spaced clamping elements, wherein the circumferentially spaced openings are provided between respective circumferentially spaced and radially extending cage components;
wherein the clamping elements are freely carried within respective circumferentially spaced openings between adjacent cage components and are pivotable between a clamping position in which the clamping elements contact both the inner ring and the outer ring to prevent relative rotation between the inner ring and the outer ring in a second direction of rotation, and a release position in which the clamping elements and the cage are spaced from the inner cylindrical surface of the outer ring and are in contact with the outer cylindrical surface of the inner ring to allow relative rotation between the inner ring and the outer ring in the first direction of rotation;
wherein each of the clamping elements has a respective center of gravity that is disposed radially outward of circumferentially spaced clamping element support surfaces of respective adjacent cage components, wherein the clamping element support surfaces are provided for guiding respective outer surfaces of respective ones of the clamping elements for allowing pivotal movement of the clamping elements within respective circumferentially spaced openings between the adjacent cage components and about respective clamping element axes of rotation that are parallel to the axis of rotation of the freewheel inner and outer rings; and
wherein respective clamping element springs are carried by the cage components and act against respective ones of the clamping elements to preload the clamping elements in a radially inward direction of the freewheel to maintain contact of the respective clamping elements with the outer cylindrical surface of the inner ring and in a direction toward the clamping position.

2. The clamping element freewheel according to claim 1, wherein the outer cylindrical surface of the inner ring and the inner cylindrical surface of the outer ring each have a circular cross-section in a sectional view perpendicular to the axial direction of the freewheel.

3. The clamping element freewheel according to claim 1, wherein the outer ring is supported relative to the inner ring by a bearing.

4. The clamping element freewheel according to claim 3, wherein the bearing is affixed to the inner ring.

5. The clamping element freewheel according to claim 3, wherein the bearing includes a pair of radially-extending straight bearing rings that face respective radial sides of the cage and that include respective support surfaces to engage and rotatably support the outer ring relative to the inner ring.

6. The clamping element freewheel according to claim 1, including a cage spring that acts against the cage to preload the cage in an axial direction of the freewheel and against a bearing ring non-rotatably carried on the outer cylindrical surface of the inner ring.

7. The clamping element freewheel according to claim 6, wherein the cage spring is a disc spring.

8. The clamping element freewheel according to claim 1, wherein the clamping element springs are configured as arm springs carried by the cage and having respective arms that extend axially relative to the freewheel axis of rotation and that engage respective radially outer surfaces of the clamping elements adjacent to and spaced from the inner surface of the outer ring.

9. The clamping element freewheel according to claim 1, wherein the clamping element springs apply a radial force component on respective clamping elements to provide on the respective clamping elements a preload force that is greater than a maximum centrifugal force acting on the respective clamping elements during rotation of the inner ring of the freewheel.

10. The clamping element freewheel according to claim 1, wherein a stop is provided on respective ones of the cage components for respective clamping elements, wherein the stop defines an end of a pivotal movement path of the clamping element when the clamping element pivots about an axis of rotation that is parallel to the freewheel axis of rotation out of the clamping position in which the clamping elements engage both the inner cylindrical surface of the outer ring and the outer cylindrical surface of the inner ring to cause the inner and outer rings to rotate together, into the release position in which the clamping elements are pivoted to a position to disengage from the inner surface of the outer ring, at which position the inner and outer rings are rotatable relative to each other.

11. The clamping element freewheel according to claim 1, wherein the clamping elements are supported in the cage with a clearance therebetween so that the clamping elements and the cage do not slide relative to each other with high frictional contact during a movement of the clamping elements between the clamping position and the release position.

12. The clamping element freewheel according to claim 1, wherein the outer ring includes a connecting rod eye that is offset from the axis of rotation of the inner and outer rings for receiving a connecting rod that is rotatable relative to an axis of the connecting rod eye of the outer ring.

13. The clamping element freewheel according to claim 12, wherein the outer ring includes a pass-through opening adjacent to and spaced from the connecting rod eye and extending axially relative to the connecting rod eye of the outer ring.

14. A crank—CVT including a clamping element freewheel according to claim 1.

15. The clamping element freewheel according to claim 1, wherein the plurality of circumferentially spaced cage openings are each defined by a pair of opposed, concave support surfaces on adjacent cage components for guiding outer surfaces of respective clamping elements for pivotal movement within the respective cage openings.

16. The clamping element freewheel according to claim 15, wherein one of the concave support surfaces that define respective cage openings includes a stop for engaging and limiting pivotal movement of a respective clamping element within a respective cage opening.

17. The clamping element freewheel according to claim 15, wherein the clamping elements include a pair of oppositely-facing lugs adjacent a radially inner surface of the clamping elements and that face respective concave support surfaces of cage openings, and wherein when the clamping elements pivot between the clamping position and the release position, outer surfaces of the lugs describe respective arcs that have a curvature that corresponds with that of adjacent concave support surfaces of the cage openings.

* * * * *